US012751436B2

(12) United States Patent
Omura

(10) Patent No.: US 12,751,436 B2
(45) Date of Patent: Oct. 6, 2026

(54) REEL SEAT AND FISHING ROD INCLUDING SAME

(71) Applicant: FUJI KOGYO CO., LTD., Shizuoka (JP)

(72) Inventor: Kazuhito Omura, Shizuoka (JP)

(73) Assignee: FUJI KOGYO CO., LTD., Shizuoka (JP)

( * ) Notice: Subject to any disclaimer, the term of this patent is extended or adjusted under 35 U.S.C. 154(b) by 77 days.

(21) Appl. No.: 18/804,197

(22) Filed: Aug. 14, 2024

(65) Prior Publication Data

US 2025/0064039 A1 Feb. 27, 2025

(30) Foreign Application Priority Data

Aug. 22, 2023 (KR) ........................ 10-2023-0109726
Dec. 27, 2023 (KR) ........................ 10-2023-0193188

(51) Int. Cl.
*A01K 87/06* (2006.01)

(52) U.S. Cl.
CPC .................................... *A01K 87/06* (2013.01)

(58) Field of Classification Search
CPC ...................................................... A01K 87/06
See application file for complete search history.

(56) References Cited

U.S. PATENT DOCUMENTS

| | | | | |
|---|---|---|---|---|
| 9,832,982 | B2 * | 12/2017 | Omura | A01K 87/06 |
| 10,321,669 | B2 * | 6/2019 | Akiba | A01K 87/06 |
| 11,617,359 | B2 * | 4/2023 | Taniguchi | A01K 87/06 43/22 |

FOREIGN PATENT DOCUMENTS

| | | | |
|---|---|---|---|
| CN | 101554147 | A | 10/2009 |
| CN | 105611830 | A | 5/2016 |
| CN | 112004412 | A | 11/2020 |
| CN | 116326555 | A | 6/2023 |
| JP | 5339525 | B2 | 11/2013 |
| JP | 5773622 | B2 | 9/2015 |
| JP | 2016-77178 | A | 5/2016 |
| JP | 2018-161061 | A | 10/2018 |
| JP | 2022-100614 | A | 7/2022 |
| JP | 2023-37192 | A | 3/2023 |
| KR | 10-2150338 | B1 | 9/2020 |
| WO | WO 2012/070259 | A1 | 5/2012 |

OTHER PUBLICATIONS

WO_2012070259 with merged translation (Year: 2012).*

* cited by examiner

*Primary Examiner* — Marisa V Conlon
(74) *Attorney, Agent, or Firm* — Oblon, McClelland, Maier & Neustadt, L.L.P.

(57) ABSTRACT

A reel seat for mounting a reel to a rod body of a fishing rod and a fishing rod including the reel seat are provided. The reel seat includes a seat body coupled to the rod body. The seat body includes a seating portion on which first and second legs of the reel are seated, and a fixed hood portion into which the first leg is inserted. The fixed hood portion includes an opening edge portion extending from the seating portion, and an inward surface extending from the opening edge portion and covering the first leg. The opening edge portion is positioned in a plane inclined at an acute angle with respect to a seating surface of the seating portion. The plane and a line bisecting the inward surface of the fixed hood portion along a central axis meet each other at an obtuse angle.

16 Claims, 13 Drawing Sheets

REEL SEAT AND FISHING ROD INCLUDING SAME

CROSS-REFERENCE TO RELATED APPLICATION

This application is based upon and claims the benefit of priority from Korean Patent Application No. 10-2023-0109726, filed on Aug. 22, 2023, and Korean Patent Application No. 10-2023-0193188, filed on Dec. 27, 2023, the entire contents of which are incorporated herein by reference.

TECHNICAL FIELD

The present disclosure relates to a reel seat fixing a fishing reel, and a fishing rod including such a reel seat.

BACKGROUND

To couple a fishing reel to a rod body of a fishing rod, a reel seat capable of fixing the reel is connected to the rod body. The reel seat may have a seat body which is formed in a pipe shape such that the rod body is inserted into the reel seat. The seat body is coupled to the rod body. The seat body has a fixed hood fixing one of the legs of the reel, and a male thread portion formed at the opposite end located opposite to the fixed hood. A movable hood for fixing the other of the reel legs is coupled to the seat body so as to be movable in an axial direction of the rod body. The fixed hood and the movable hood fixedly support respective reel legs, thereby fixing the reel.

Referring to FIG. 1, a fishing rod 10 according to a prior art technique includes a reel 11 including a reel leg, a reel seat 12 fixing the reel 11 by fixedly supporting the reel leg, and a rod body 13 penetrating through the reel seat 12. The reel seat 12 includes a seat body 121 and a movable hood 122. Referring to FIG. 2, the seat body 121 includes an attachment body 121*a* fixedly supporting one end of the reel leg of the reel (the reel 11 in FIG. 1), a cylindrical portion 121*b* through which the rod body (the rod body 13 in FIG. 1) is inserted and penetrates, and a grip body 121*c* fastened to the cylindrical portion 121*b* to surround the outward portion of the cylindrical portion 121*b*.

Referring to FIG. 3 where area A of FIG. 2 is enlarged, a fixed hood 123 of the attachment body (e.g., the attachment body 121*a* in FIG. 2) includes an opening portion HP into which one end of the reel leg is inserted. A plane VP where an entrance of the opening portion HP is formed, and an upper contour line 123L in the inclined shape of the fixed hood 123 form an angle aa therebetween, and the angle aa is formed to be approximately perpendicular. Due to the aforementioned angle aa, when one end of the reel leg is coupled to the fixed hood 123, an unevenness is formed between the reel and the reel seat. Thus, when gripping the reel seat, an angler may feel a foreign body sensation or an uncomfortable feel, and a grip feel may deteriorate accordingly.

Accordingly, in order for an angler to comfortably grip the fishing rod, it is required to minimize the unevenness between the reel leg and the reel seat. For example, it is required that a connected portion where the opening portion HP of the fixed hood 123 and the reel leg are connected forms a continuous curved surface.

SUMMARY

Disclosed embodiments provide a reel seat that solves at least one or more of the aforementioned problems of the prior art technique. One embodiment of the present disclosure provides a reel seat that does not provide a foreign body sensation to angler's fingers and can be gripped comfortably. One embodiment of the present disclosure provides a reel seat that has a thin thickness and has a sharp appearance similar to a cylindrical shape. One embodiment of the present disclosure provides a reel seat that has a thin thickness and a reduced weight and includes an integrally formed seat body. One embodiment of the present disclosure provides a reel seat which includes a movable hood having an enhanced strength. One embodiment of the present disclosure provides a fishing rod including the above-described reel seat.

The disclosed embodiments relate to a reel seat for coupling a reel to a rod body of a fishing rod. According to one aspect of the embodiments of the reel seat, the reel seat for mounting a reel having a first leg and a second leg to a rod body of a fishing rod includes: a seat body including a seating portion on which the first leg and the second leg are seated and a fixed hood portion which is located in the seating portion and into which the first leg is inserted, wherein the seat body is coupled to the rod body along a central axis of the rod body; and a movable hood movably coupled to the seat body so as to fix the second leg to the seating portion. The fixed hood portion includes an opening edge portion extending from the seating portion so as to form an opening into which the first leg is inserted, and an inward surface extending from the opening edge portion and covering the first leg. The opening edge portion is positioned in a first plane inclined at an acute angle with respect to a seating surface in which the seating portion is formed, and the first plane and a first line bisecting the inward surface along the central axis are configured to meet each other at an obtuse angle.

In one embodiment, the seating surface may be parallel to the central axis, and the first plane may be formed to be inclined at an angle of 15 to 25 degrees with respect to the seating surface.

In one embodiment, the opening edge portion includes a pair of first opening edge portions extending from the seating portion and spaced apart from each other with reference to the central axis, and a second opening edge portion interconnecting the pair of first opening edge portions. Each of the pair of first opening edge portions has a first inward edge line, which is formed along a line where the first opening edge portion meets the inward surface and has a straight line shape. The second opening edge portion has a second inward edge line, which is formed along a line where the second opening edge portion meets the inward surface and has a semicircular shape.

In one embodiment, when viewed from a top view of the reel seat, an edge depth defined as a length of a third line, which interconnects a midpoint of a second line interconnecting intersection points between the pair of first inward edge lines and the second inward edge line and a midpoint of the second inward edge line, may be 0.45 to 0.55 times an edge width defined as a length of the second line.

In one embodiment, when viewed from the top view of the reel seat, the semicircular shape of the second inward edge line may be tangent to the pair of first inward edge lines at the intersection points.

In one embodiment, when the reel seat is viewed from a side view, a sum of a length of one of the pair of first opening edge portions and a length of the second opening edge portion may be larger than a length of the first line.

In one embodiment, the fixed hood portion may include an inclined wall between each of the pair of first opening edge portions and the seating portion. The inclined wall may have an oblique side including one of the pair of first inward edge lines, and a bottom side formed at a boundary between the fixed hood portion and the seating portion.

In one embodiment, the inclined wall may have a constant thickness, and the thickness at a boundary between the inclined wall and the seating portion may be in a range of 2 mm to 3 mm.

In one embodiment, the seat body may include: a cylindrical portion having a first bore capable of being coupled to the rod body; and an attachment body. The attachment body has: the seating portion formed at an upper side or a lower side of the cylindrical portion; a first projecting portion located at an opposite side of the seating portion with reference to the central axis and formed in a circumferential direction of the central axis; and a second projecting portion extending along the central axis from the first projecting portion along an outer periphery of the cylindrical portion and forming the fixed hood portion together with the seating portion. The movable hood may be movably coupled to a male thread portion located opposite to the fixed hood portion. The movable hood may include an accommodating portion into which the first projecting portion is inserted along the central axis, and a movable hood portion located at an opposite side of the accommodating portion in a vertical direction, wherein the movable hood portion overlaps the first projecting portion along the central axis and fixes the second leg to the seating portion.

In one embodiment, the seat body may further include a grip body into which the cylindrical portion is fitted and which is coupled to the rod body of the fishing rod. The grip body may include a second bore into which the cylindrical portion is fitted along the central axis, a third bore communicating with the second bore and capable of being coupled to the rod body of the fishing rod, and a cutaway edge formed complementarily to an edge of the first projecting portion and an edge of the second projecting portion and cut away so as to expose a portion of the second bore.

In one embodiment, the first projecting portion may have a first radius, which is a distance from the central axis to an outer peripheral surface of the first projecting portion, and a radius of the first bore may be in a range of 0.59 to 0.71 times the first radius.

In one embodiment, the grip body may have a second radius equal to the first radius at a portion where the cutaway edge is formed.

In one embodiment, the opening edge portion may include a pair of first opening edge portions extending from the seating portion and spaced apart from each other with reference to the central axis, and a second opening edge portion interconnecting the pair of first opening edge portions. Each of the pair of first opening edge portions may have a first inward edge line facing the central axis and having a straight line shape, and the second opening edge portion may have a second inward edge line formed in a semicircular shape. When the reel seat is viewed from a top view, an edge width, which is defined as a length of a second line interconnecting intersection points between the first inward edge lines and the second inward edge line, may be in a range of 1.18 to 1.42 times the first radius.

In one embodiment, the fixed hood portion may include an inclined wall between each of the pair of first opening edge portions and the seating portion, and the inclined wall may have a height, which is defined as a length from the seating portion to each of the intersection points and is in a range of 0.19 to 0.27 times the first radius.

In one embodiment, the attachment body may further include a pair of inclined protruding portions located at an opposite side of the first projecting portion with reference to the central axis and protruding from the seating portion. Each of the pair of inclined protruding portions may have a height, which is defined as a distance from the seating portion to an apex of each of the inclined protruding portions and is in a range of 0.06 to 0.10 times the first radius.

In one embodiment, the seat body may be integrally formed and may be made of carbon fiber-reinforced thermoplastic resin.

The disclosed embodiments relate to a fishing rod including the reel seat. The fishing rod according to one embodiment includes a rod body and the reel seat according to the above-described one embodiments coupled to the rod body.

In one embodiment, the fixed hood portion has the opening edge portion extending from the seating portion so as to form the opening into which the first leg of the reel is inserted, and the inward surface extending from the opening edge portion and covering the first leg. The opening edge portion is positioned in the first plane inclined at an acute angle with respect to the seating portion. The first plane and the first line bisecting the inward surface along the central axis in the longitudinal direction of the reel seat meet each other at an obtuse angle. Therefore, the reel seat according to one embodiment does not provide a foreign body sensation to the angler's fingers and can allow the angler's fingers to grip the reel seat comfortably.

According to one embodiment, the opening edge portion includes the pair of first opening edge portions extending from the seating portion and spaced apart from each other with reference to the central axis formed in the longitudinal direction of the reel seat, and a second opening edge portion interconnecting the pair of first opening edge portions. Each of the pair of first opening edge portions has the first inward edge line facing the central axis and having a straight line shape, and the second opening edge portion has the second inward edge line formed in a semicircular shape. The edge depth, which is defined as the length of the third line interconnecting the midpoint of the second line interconnecting the intersection points between the pair of first inward edge lines and the second inward edge line and the midpoint of the second inward edge line, has a specific ratio to the edge width defined as the length of the second line. Therefore, a foreign body sensation felt on the angler's fingers gripping the reel seat along the fixed hood portion can be reduced, and a grip feel can be enhanced.

According to one embodiment, the fixed hood portion includes the inclined wall between each of the pair of first opening edge portions and the seating portion, the inclined wall has a constant thickness, and the thickness at the boundary between the inclined wall and the seating portion is in a certain range. Therefore, it is possible to reduce a foreign body sensation that is caused to the angler's fingers gripping the reel seat along the first opening edge portions due to a step difference between the reel leg and the fixed hood portion.

According to one embodiment, the seat body is integrally formed using carbon fiber-reinforced thermoplastic resin having a low density and a high tensile strength. Accordingly, the portions making contact with index and middle fingers can have a thin thickness, the seat body can have a reduced weight, and the performance of delivering a bite signal to an angler can be enhanced.

BRIEF DESCRIPTION OF DRAWINGS

The accompanying drawings, which are incorporated in and constitute a part of the specification, illustrate embodiments of the present disclosure, and together with the general description given above and the detailed description of the embodiments given below, serve to explain the principles of the present disclosure.

DETAILED DESCRIPTION

Figure 1:
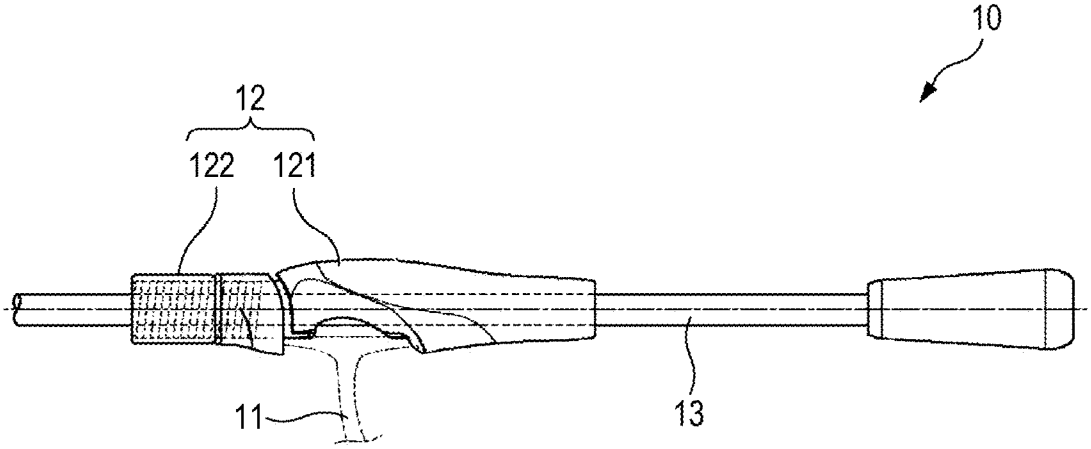
FIG. 1 (PRIOR ART)
FIG. 1 is a side view showing a fishing rod according to a prior art technique.
Figure 2:
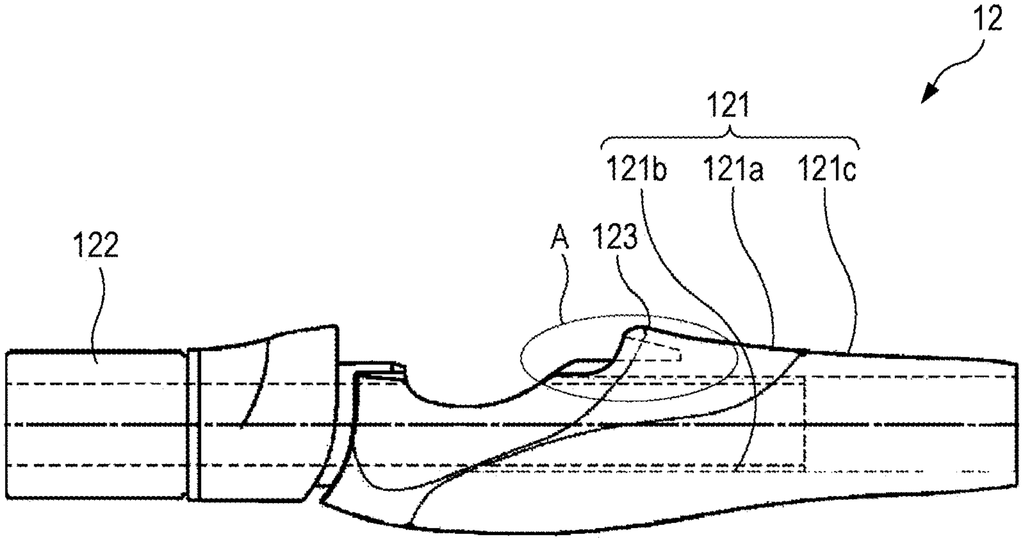
FIG. 2 (PRIOR ART)
FIG. 2 is a side view showing a reel seat according to a prior art technique.
Figure 3:
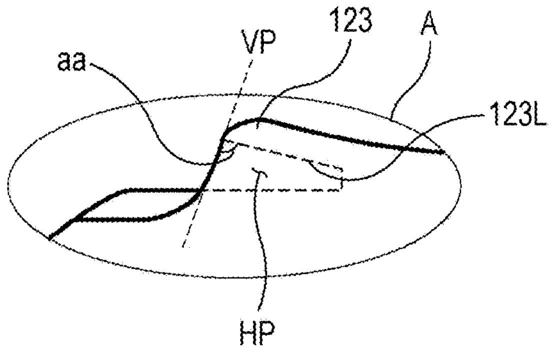
FIG. 3 (PRIOR ART)
FIG. 3 is an enlarged view of area A shown in FIG. 2.

Embodiments of the present disclosure are illustrated for the purpose of explaining the technical idea of the present disclosure. The scope of the rights according to the present disclosure is not limited to the embodiments presented below or the detailed descriptions of such embodiments.

All technical terms and scientific terms used in the present disclosure include meanings that are commonly understood by those of ordinary skill in the technical field to which the present disclosure pertains unless otherwise defined. All terms used in the present disclosure are selected for the purpose of describing the present disclosure more clearly, and are not selected to limit the scope of the rights according to the present disclosure.

Expressions such as "comprising," "including," "having," and the like used in the present disclosure are to be understood as open-ended terms having the possibility of encompassing other embodiments, unless otherwise mentioned in the phrase or sentence containing such expressions.

Singular expressions described in the present disclosure may encompass plural expressions unless otherwise stated, which will also apply to singular expressions recited in the claims.

Expressions such as "first," "second," etc. used in the present disclosure are used to distinguish a plurality of elements from one another, and are not intended to limit an order or importance of the elements.

In the present disclosure, the description that one element is "connected" or "coupled" to another element should be understood to indicate that the aforesaid one element may be directly connected, or coupled, to the aforesaid another element, and should be further understood that the aforesaid one element may be connected or coupled to the aforesaid another element via a new element.

The dimensional and numerical values described in the present disclosure are not limited only to the dimensional and numerical values that are described herein. Unless specified otherwise, the dimensional and numerical values may be understood to mean the described values and equivalent ranges including the values.

The directional terms "frontward" and "front" used in the present disclosure mean a direction directed toward a tip of a fishing rod, while the directional terms "rearward" and "rear" mean a direction directed toward a butt of a fishing rod. For example, an arrow FD shown in FIG. 4 indicates a frontward direction directed toward a tip of a fishing rod, while an arrow RD shown in FIG. 4 indicates a rearward direction directed toward a butt of the fishing rod. The directional terms "upward," "upper" and the like used in the present disclosure and the directional terms "downward," "lower" and the like used in the present disclosure are based on an upward side and a downward side in the accompanying drawings.

Hereinafter, the embodiments of the present disclosure are described with reference to the accompanying drawings. Like reference numerals in the accompanying drawings denote like or corresponding elements. Further, in the following description of the embodiments, redundant descriptions for the same or corresponding elements may be omitted. However, even if the descriptions of the elements are omitted, such elements are not intended to be excluded in any embodiment.

Figure 4:
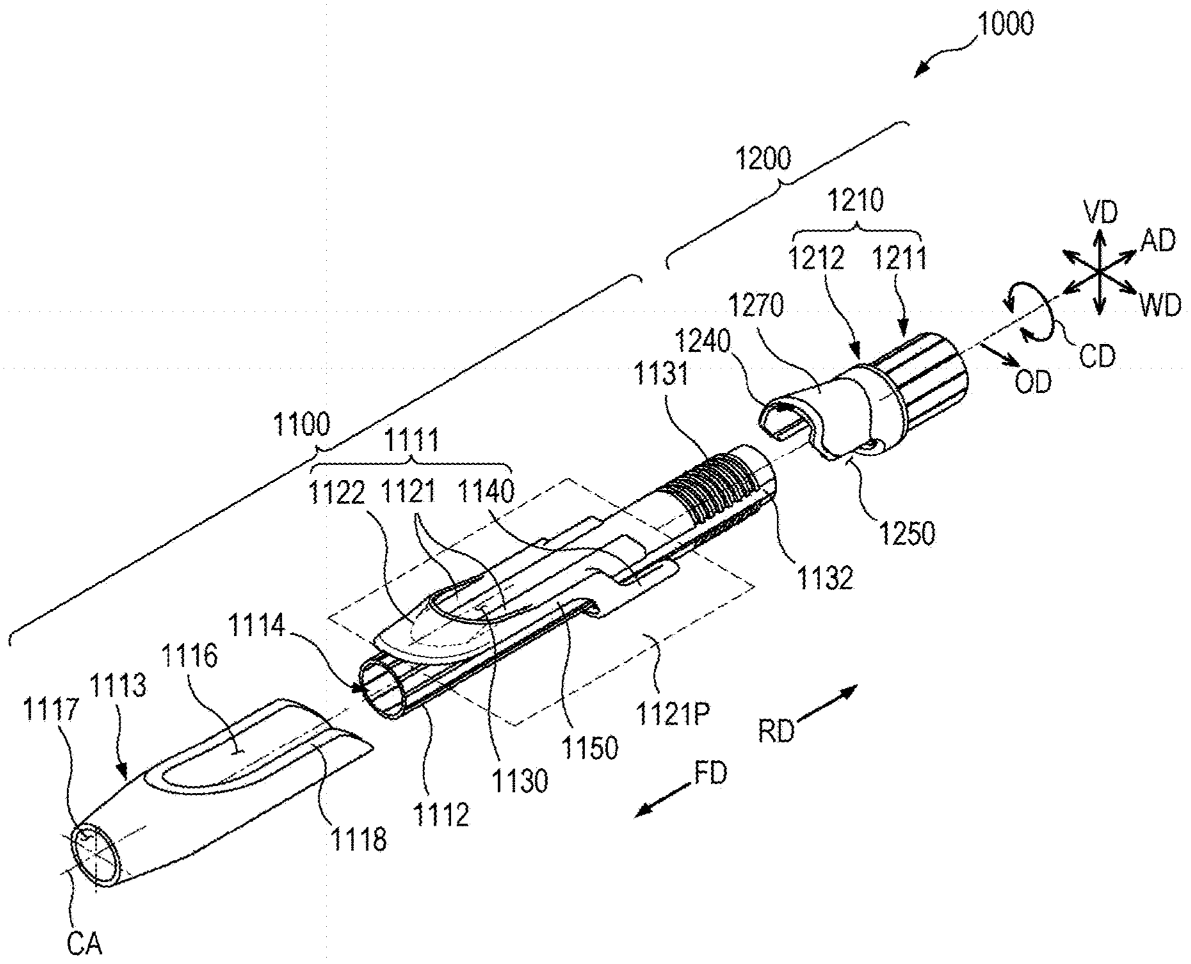
FIG. 4 is an exploded perspective view showing a reel seat according to one embodiment of the present disclosure.
Figure 5:
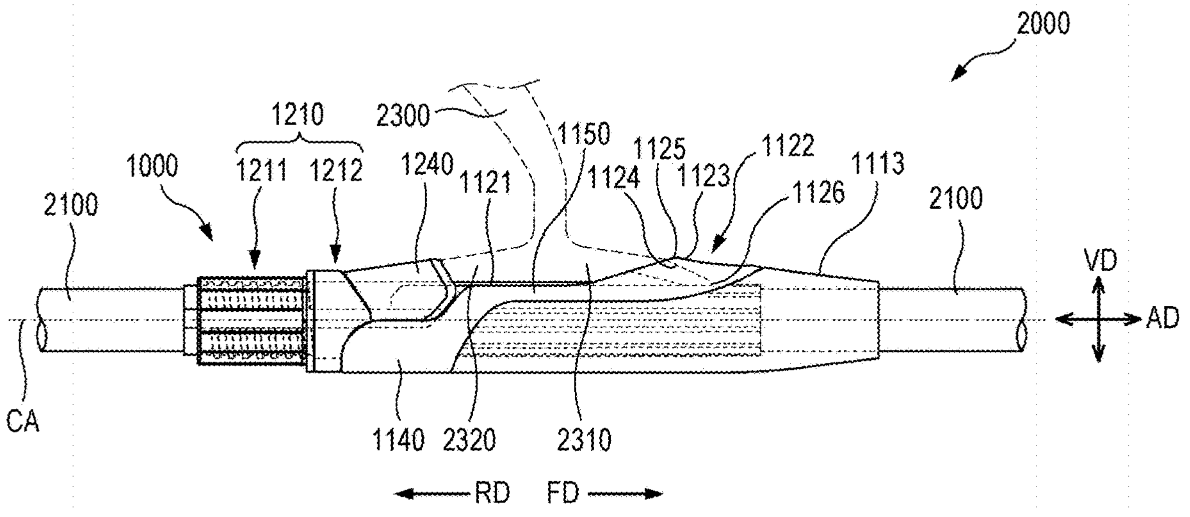
FIG. 5 is a side view showing a fishing rod including the reel seat of FIG. 4 to which a reel is attached.
Figure 6:
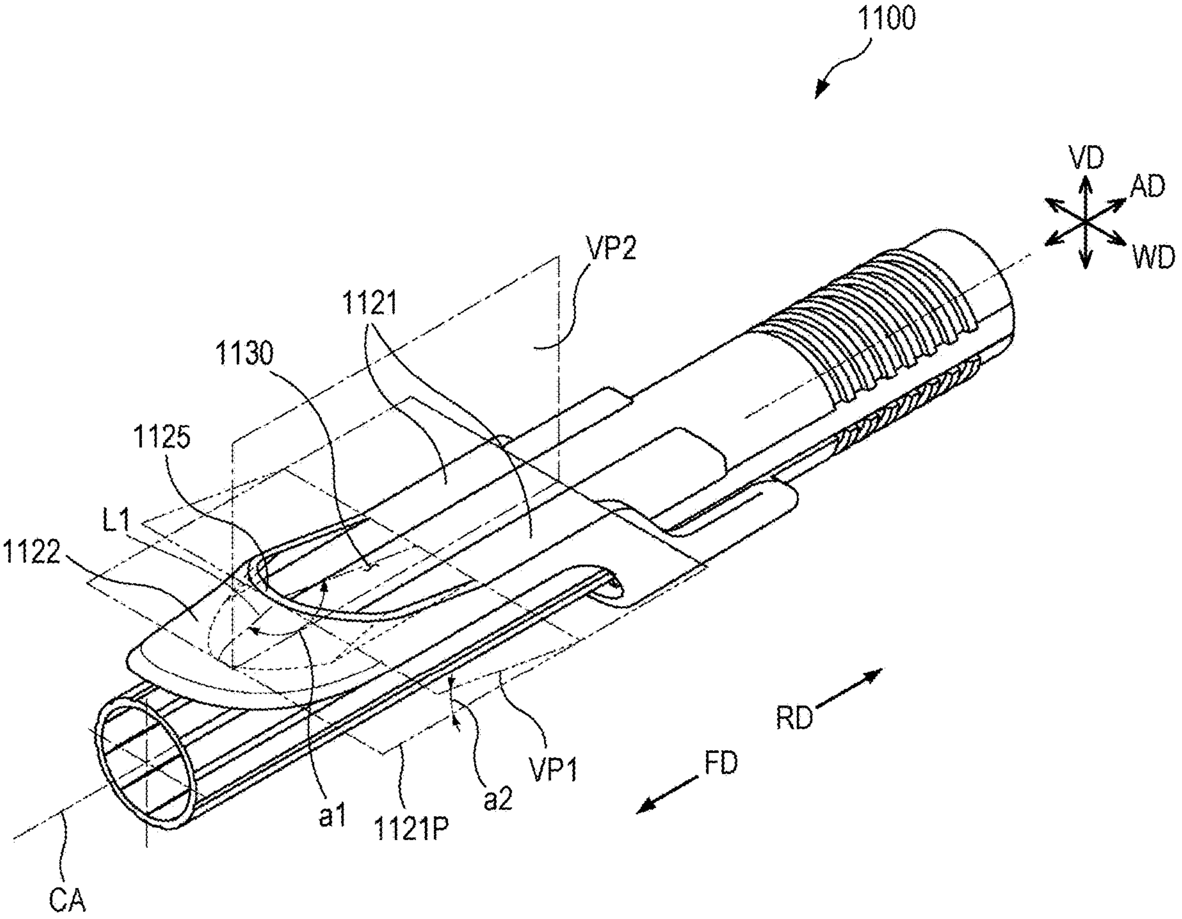
FIG. 6 is a perspective view showing a seat body according to one embodiment including auxiliary planes for explaining angles between components of a fixed hood.
Figure 7:
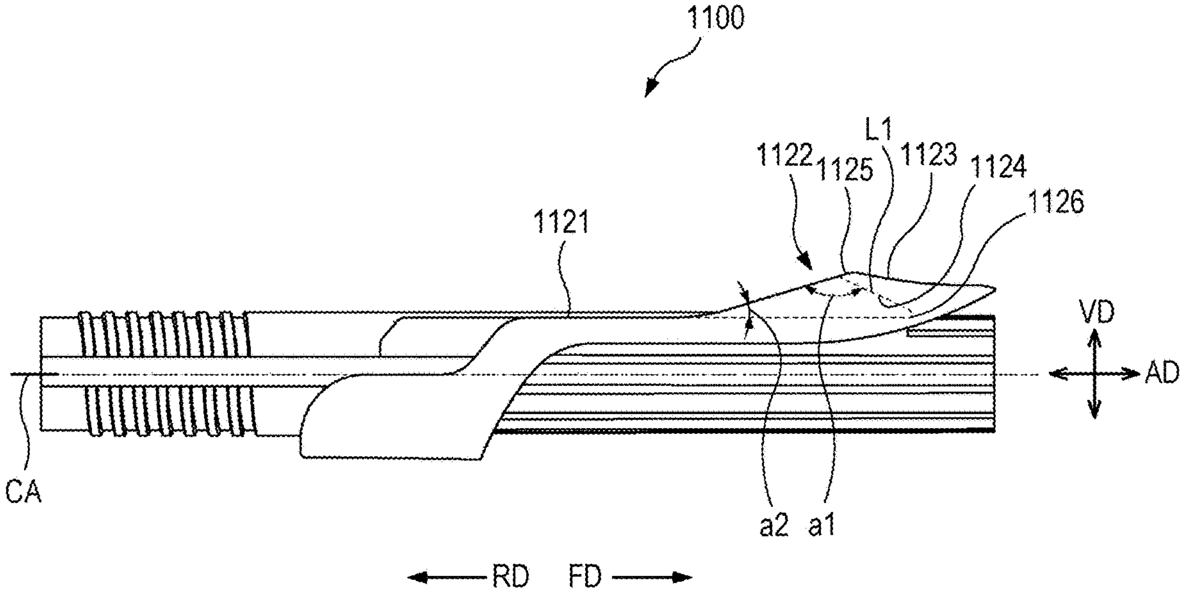
FIG. 7 is a side view showing the seat body shown in FIG. 6.

FIG. 4 is an exploded perspective view showing a reel seat 1000 according to one embodiment. FIG. 5 is a side view showing a fishing rod 2000 including the reel seat 1000 of FIG. 4 in a state where a reel 2300 is attached. FIG. 6 is a perspective view showing a seat body 1100 according to one embodiment including auxiliary planes for explaining angles between components of a fixed hood. FIG. 7 is a side view showing the seat body 1100 depicted in FIG. 6. Reference is made to FIGS. 4 to 7.

The fishing rod 2000 includes a rod body 2100, which can elastically deform during fishing and has a thin and long shape. The fishing rod 2000 may include a single rod body or a plurality of rod bodies. The rod body may be a pipe-shaped part or a cylindrical column-shaped part.

The fishing rod 2000 includes the reel seat 1000 according to one embodiment of the present disclosure. The reel seat

1000 may be coupled to the rod body 2100. The reel seat 1000 fixes and supports a reel on which the fishing line is wound. An angler can manipulate the reel with one hand in a state where the angler grips the reel seat 1000 with the other hand. Thus, the reel seat 1000 can function as a part for coupling the reel to the rod body of the fishing rod and can function as a part gripped by the angler. The reel 2300 has a first leg 2310 and a second leg 2320, which extend in a frontward direction FD and a rearward direction RD, respectively. The reel seat 1000 releasably fixes the first leg 2310 and the second leg 2320 of the reel, whereby the reel is detachably coupled to the reel seat 1000.

Referring to FIG. 5, in the fishing rod according to one embodiment, the reel 2300 may be a spinning reel, but the reel attached to the reel seat is not limited to the spinning reel. The spinning reel may be attached to a lower side of the reel seat 1000. Thus, in FIGS. 4 to 7, the upper side may be one side of the reel seat to which the reel 2300 is attached. Further, the reel seat 1000 may be configured such that a portion thereof is moved from the rear to the front to fix one of the reel legs (see, for example, FIGS. 5 and 19), or such that a portion thereof is moved from the front to the rear to fix one of the reel legs (see, for example, FIG. 24).

Referring to FIG. 4, the reel seat 1000 includes a seat body 1100 that functions as a main body of the reel seat 1000. An angler may grip a portion of the seat body 1100. The first leg 2310 and the second leg 2320 of the reel are seated on an upper side of the seat body 1100, and the seat body 1100 fixes the first leg 2310. The reel seat 1000 includes a movable hood 1200 fixing the second leg of the reel to the seat body 1100. The movable hood 1200 is movably coupled to the seat body 1100.

In the reel seat 1000 according to one embodiment, the seat body 1100 functions to attach the reel seat 1000 to the rod body 2100 of the fishing rod and functions to support the reel 2300. A portion of the seat body 1100 may be gripped by the angler's fingers, and the remaining portion of the seat body 1100 may be coupled to the movable hood 1200.

Continuing with reference to FIGS. 4 and 5, the seat body 1100 has a pipe shape. The seat body 1100 may be distinguished into a male thread portion 1131, an attachment body 1111, a cylindrical portion 1112, and a grip body 1113. The attachment body 1111 may be formed so as to surround the cylindrical portion 1112 in a circumferential direction CD of a central axis CA. The attachment body 1111 may be gripped by the angler's fingers. The cylindrical portion 1112 extends rearward from the attachment body 1111. The grip body 1113 is fitted to a front end of the cylindrical portion 1112 along the central axis CA. The grip body 1113 is coupled to the rod body 2100. An outer peripheral surface of the grip body 1113 is formed not to have a step difference with respect to an outer peripheral surface of the attachment body 1111 within a predetermined range.

The attachment body 1111 has a seating portion 1121. The seating portion 1121 forms a portion of an upper surface of the attachment body 1111 (or a portion of an upper surface of the seat body) along the central axis CA. By way of example, referring to FIG. 6, the seating portion 1121 may include a pair of surfaces formed on the upper side of the attachment body along the central axis CA.

The attachment body 1111 has a fixed hood portion 1122 located at a front end of the seating portion 1121. The fixed hood portion 1122 is located opposite to the movable hood 1200 along the central axis CA. The fixed hood portion 1122 may be formed as a wedge-shaped groove at the front end of the seating portion 1121. When the reel is attached to the seat body 1100, the first leg 2310 of the reel is inserted and fitted into the fixed hood portion 1122. The fixed hood portion 1122 fixes the first leg 2310 to the seating portion 1121. Referring to FIG. 6, the fixed hood portion 1122 includes an opening edge portion 1125 extending from the seating portion 1121 so as to form an opening 1130 into which the first leg 2310 of the reel is inserted. Referring to FIG. 7, the fixed hood portion 1122 includes an inward surface 1124, which extends from the opening edge portion 1125 toward an inside of the opening 1130 and covers the first leg. The fixed hood portion 1122 includes an outward surface 1123, which extends from the opening edge portion 1125 to an outside of the opening 1130 and is formed at the opposite side of the inward surface 1124. The fixed hood portion 1122 includes a blind end portion 1126, which is formed at a boundary where the inward surface 1124 and the seating portion 1121 meet each other.

Referring to FIG. 4 or FIG. 5, the attachment body 1111 includes a first projecting portion 1140 that forms a rear end portion of the attachment body 1111. When the angler grips the attachment body 1111 of the seat body, the angler's palm may make contact with the first projecting portion 1140. The first projecting portion 1140 is located at the opposite side of the seating portion 1121 with reference to the central axis CA, and is formed in the circumferential direction CD of the central axis. The first projecting portion 1140 is located below the seating portion 1121 with reference to the central axis CA. Further, the first projecting portion 1140 projects in a radially outward direction OD of the central axis CA. Specifically, the first projecting portion 1140 projects with respect to the cylindrical portion 1112 in the radially outward direction OD.

The male thread portion 1131 and a pair of guide grooves 1132 function as portions for coupling the movable hood 1200 to the seat body 1100. The male thread portion 1131 has a threaded shape within a predetermined range, and has a thread-less shape formed on an outer periphery of the male thread portion 1131 frontward from a terminal end of the threaded shape. The male thread portion 1131 is coupled to the movable hood 1200. The pair of guide grooves 1132 extend along the central axis CA from a rear end of the seat body through the male thread portion 1131 to the attachment body 1111. The pair of guide grooves 1132 guide movement of the movable hood 1200 along the central axis CA. The pair of guide grooves 1132 are located opposite to each other with respect to the central axis CA. The cylindrical portion 1112 includes a first bore 1114 capable of being coupled to the rod body 2100. The first bore 1114 may be formed to surround a cylindrical outer peripheral surface of the rod body 2100. The first bore 1114 has a constant circumference along the central axis CA. A radius of the first bore 1114 (e.g., a radius 1114R in FIG. 15) is defined as a distance from the central axis CA to an inner peripheral surface of the first bore 1114.

Referring to FIG. 4, the grip body 1113 includes a second bore 1116, a third bore 1117, and a cutaway edge 1118. The second bore 1116 fits to the cylindrical portion 1112 along the central axis CA. The second bore 1116 may be formed such that a portion of the grip body 1113 surrounding the second bore 1116 is cut away. The third bore 1117 is coupled to the rod body 2100 of the fishing rod 2000 along the central axis CA. The third bore 1117 communicates with the second bore 1116. The cutaway edge 1118 corresponds to an edge that remains by partly cutting away a portion of the outer peripheral surface surrounding the second bore 1116. The cutaway edge 1118 is formed so as to expose the second bore 1116.

Referring to FIG. 4, the movable hood 1200 is coupled to the seat body 1100 so as to be movable along the central axis CA. Specifically, the movable hood 1200 is movably coupled to the male thread portion 1131. The movable hood 1200 can be moved along the male thread portion 1131 through a thread engagement action. The movable hood 1200 includes a nut 1211 causing the thread engagement action, and a movable body 1212 movable along the central axis CA by the nut 1211. The nut 1211 and the movable body 1212 are formed in a ring shape, and the male thread portion 1131 passes through the nut 1211 and the movable body 1212. The nut 1211 is threadedly coupled to the male thread portion 1131 of the cylindrical portion 1112 so as to be rotatable in the circumferential direction CD of the central axis CA. The nut 1211 has a female thread on its inner periphery. The female thread and the male thread portion 1131 are engaged to each other, whereby the nut 1211 is coupled to the cylindrical portion 1112 so as to be movable through thread engagement action. As the nut 1211 is rotated in the circumferential direction CD, by the thread engagement action between the female thread and the male thread portion 1131, the nut 1211 may be moved in the rearward direction or the frontward direction while being rotated.

The nut 1211 is connected to the movable body 1212 so as to be relatively rotatable in the circumferential direction CD. The movable body 1212 has a shape capable of covering and pressing the second leg of the reel. The movable body 1212 is movable in an axial direction AD along the central axis CA, but is not rotated in the circumferential direction CD. That is, the movable body 1212 is guided by the guide grooves 1132 of the male thread portion 1131 so as to be moved only along the central axis CA.

Referring to FIGS. 4 and 5, the movable body 1212 includes a movable hood portion 1240 and an accommodating portion 1250. The movable hood portion 1240 may form a portion of upper and front portions of the movable body 1212. The accommodating portion 1250 is located at the opposite side of the movable hood portion 1240 in a vertical direction VD. The accommodating portion 1250 may form a portion of lower and front portions of the movable body 1212.

The movable hood portion 1240 extends frontward, and may be formed in a shape covering the second leg 2320 of the reel 2300. The movable hood portion 1240 may be formed in a shape that substantially corresponds to a shape obtained by bisecting a truncated cone in the axial direction thereof. As the movable body 1212 is moved toward the fixed hood portion 1122 by the nut 1211, the movable hood portion 1240 presses and fixes the second leg to the seating portion 1121 of the attachment body 1111.

According to one embodiment of the present disclosure, the movable body 1212 may further include a reinforcing cover 1270, which is engaged with the movable hood portion 1240 to reinforce the movable hood portion 1240. The reinforcing cover 1270 is configured to cover an outward surface of the movable hood portion 1240 of the movable hood 1200 along the central axis CA and in the circumferential direction CD of the central axis. Therefore, the reinforcing cover 1270 can prevent the deformation of the movable hood portion 1240 of the movable hood. The reinforcing cover 1270 may be made of a metal material. By way of example, the metal material of the reinforcing cover may be titanium having a light weight and a high strength. As another example, the metal material of the reinforcing cover may be stainless steel or aluminum having a decorative property. Since the reinforcing cover 1270 made of a metal material covers the movable hood portion 1240, the movable hood 1200 can have a decorative property and a high-end feel. The reinforcing cover 1270 may be formed from a metal plate material by press working. The reinforcing cover 1270 made of the metal material may have elasticity and rigidity. Thus, the reinforcing cover 1270 may be coupled to the movable hood portion 1240 in such a way of pressing the reinforcing cover 1270 toward the movable hood portion 1240 to be snap-coupled to the movable hood portion.

The accommodating portion 1250 is located at the opposite side of the movable hood portion 1240 in the vertical direction VD, for example, below the movable hood portion 1240. Assuming a truncated cone shape of the movable body 1212, the accommodating portion 1250 may be formed in a shape that corresponds to a shape obtained by cutting away such a truncated cone shape so that the movable hood portion 1240 remains. Thus, the accommodating portion 1250 may be formed as a space located below the movable hood portion 1240. As described above, the movable hood 1200 includes the movable hood portion 1240 pressing and fixing the second leg to the seating portion 1121, and the accommodating portion 1250 located below the movable hood portion 1240 in the vertical direction VD and formed as a space below the movable hood portion 1240. The movable hood portion 1240 and the accommodating portion 1250 have a common edge in the circumferential direction CD.

Referring to FIG. 4, the first projecting portion 1140 of the seat body and the accommodating portion 1250 of the movable body have a complementary shape. As the movable hood 1200 is moved toward the fixed hood portion 1122 so as to fix the second leg, the movable hood portion 1240 of the movable body 1212 is moved alongside the first projecting portion 1140 along the central axis CA, and the first projecting portion 1140 is accommodated in the accommodating portion 1250. Therefore, when the movable hood 1200 fixes the second leg, a portion of the movable hood (e.g., the movable hood portion 1240) and a portion of the seat body (e.g., the first projecting portion 1140) are positioned in the vertical direction VD, and the portion of the movable hood is positioned above the first projecting portion 1140.

The first projecting portion 1140 is located opposite to the accommodating portion 1250 along the central axis CA. The accommodating portion 1250 is concave with respect to the first projecting portion 1140. Thus, when the movable hood 1200 is moved toward the fixed hood portion 1122 to press and fix the second leg to the seating portion 1121, the first projecting portion 1140 can be inserted and fitted into the accommodating portion 1250, and the accommodating portion 1250 can accommodate the first projecting portion 1140.

According to one embodiment, the seat body 1100 of the reel seat is integrally formed by injection molding. The seat body 1100 may be integrally molded from thermoplastic resin such that the grip body 1113 is fitted into the above-described cylindrical portion 1112. By way of example, the seat body 1100 may be integrally formed using carbon fiber-reinforced thermoplastic resin. The carbon fiber reinforced thermoplastic resin has a lower density and a higher tensile strength, when compared with the commonly used glass fiber-reinforced thermoplastic resin. As an example, as a material of the seat body 1100, carbon fiber-reinforced thermoplastic resin having a grade of PA12-CF30 (L7) may be used. As for the material properties of such carbon fiber-reinforced thermoplastic resin, a tensile strength may be 270 MPa, a bending strength may be 340 MPa, a bending elastic modulus may be 17,000 MPa, a Charpy notched impact strength may be 22 $kJ/m^2$, a deflection temperature under load may be 178 degrees C., and a density may be 1.16 $g/cm^3$.

As a comparative example, the seat body of the reel seat may be integrally formed using glass fiber-reinforced thermoplastic resin having a grade of PA66-GF30. As for the material properties of such glass fiber-reinforced thermoplastic resin, a tensile strength may be 140 MPa, a bending strength may be 215 MPa, a bending elastic modulus may be 6,800 MPa, a Charpy notched impact strength may be 16 $kJ/m^2$, a deflection temperature under load may be 262 degrees C., and a density may be 1.37 $g/cm^3$. The carbon fiber-reinforced thermoplastic resin, which has a lower density and a higher tensile strength in comparison with the glass fiber-reinforced thermoplastic resin, constitutes the seat body of the reel seat according to one embodiment. Thus, the seat body according to one embodiment can have a thinner thickness at a portion making contact with the angler's fingers, and can have a reduced weight.

Continuing with reference to FIGS. 6 and 7, in one embodiment, the seating portion 1121 may be formed flat to stably seat the first and second legs of the reel. Specifically, the seating portion 1121 is formed in a seating surface 1121P. The opening edge portion 1125 is formed in an inverted U shape with reference to the seating portion 1121. The opening edge portion 1125 is formed to surround at least a portion of the opening 1130. The opening edge portion 1125 is formed in a first plane VP1. The opening edge portion 1125 is formed to be inclined upward from the seating portion 1121. The first plane VP1 in which the opening edge portion 1125 is formed forms a predetermined angle a2 with respect to the seating surface 1121P. The first plane VP1 meets the seating surface 1121P while forming an acute angle with respect to the seating surface. The first plane VP1 is formed to be inclined at an angle of 15 to 25 degrees with respect to the seating surface 1121P. Preferably, the first plane VP1 is formed to be inclined at 20 degrees with respect to the seating surface 1121P. Since the first plane VP1 is formed so as to be inclined by the aforementioned angle range with respect to the seating surface 1121P, a foreign body sensation felt on the angler's fingers can be reduced, and the grip feel can be enhanced accordingly.

A second plane VP2 is formed perpendicularly to the seating surface 1121P along the central axis CA. The inward surface 1124 extending from the opening edge portion 1125 into the opening 1130 toward the seating portion 1121 is bisected by the second plane VP2. The inward surface 1124 is bisected by a first line L1 where the second plane VP2 and the inward surface 1124 intersect. The first line L1 has a predetermined angle a1 with respect to the first plane VP1. That is, the first line L1 is formed so as to be inclined with respect to the first plane VP1. The first line L1 and the first plane VP1 meet with each other by forming an obtuse angle.

Figure 8:
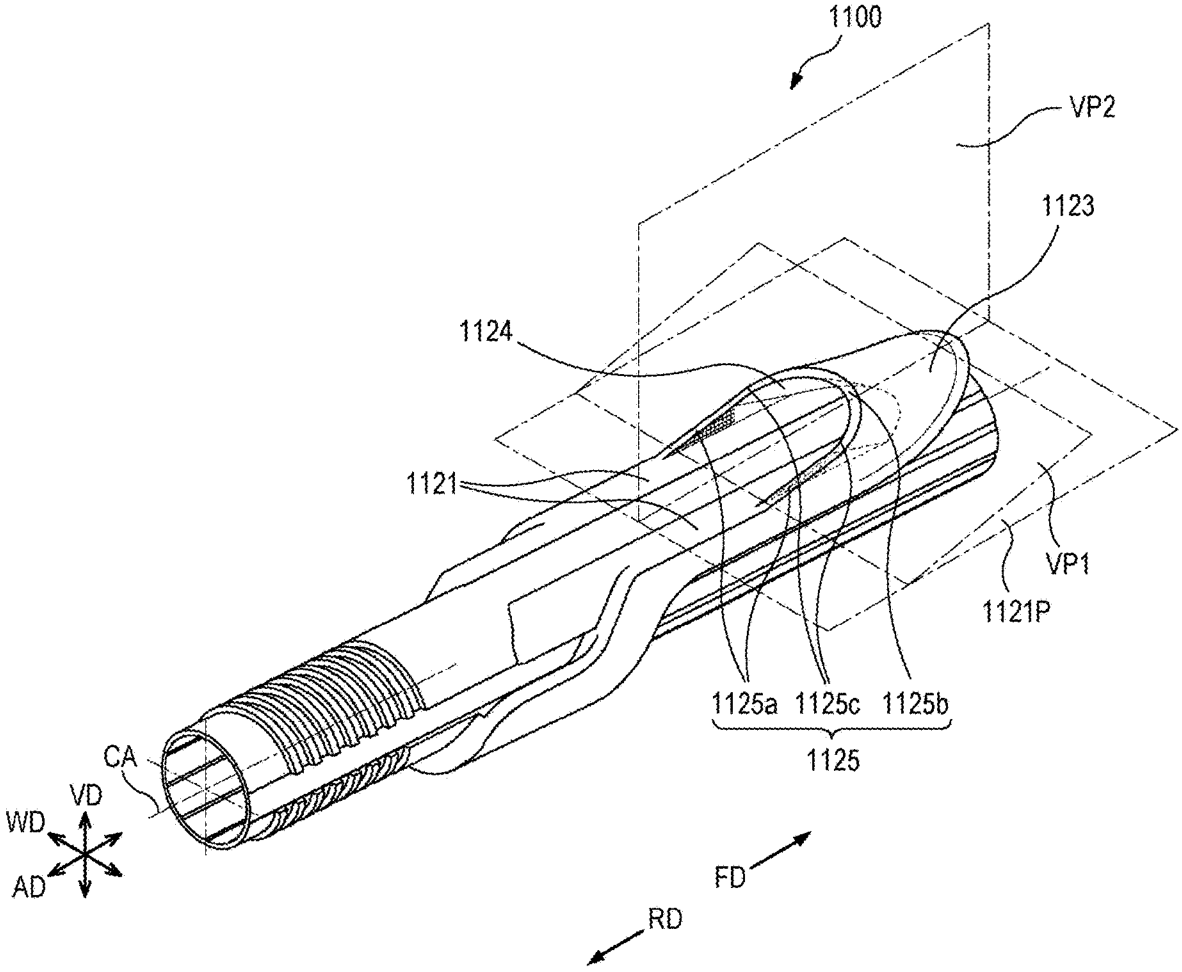
FIG. 8 is a perspective view showing the seat body according to one embodiment for explaining an opening edge portion.
Figure 9:
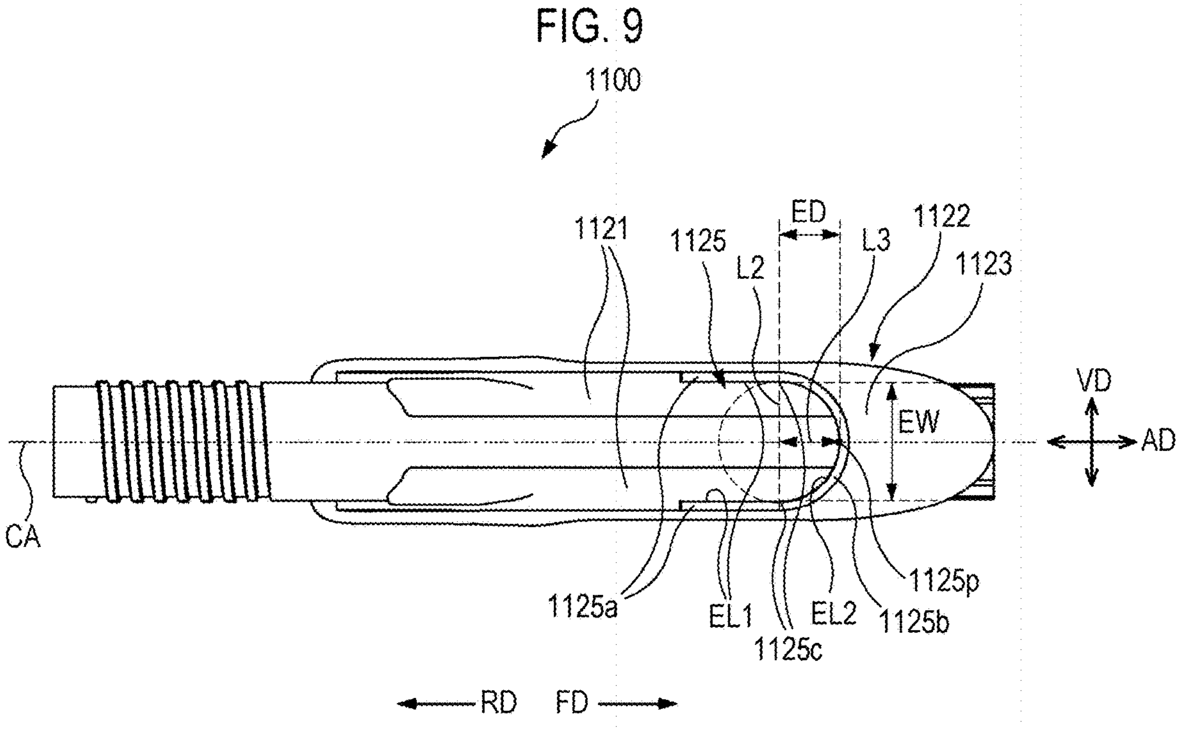
FIG. 9 is a top view of the seat body shown in FIG. 8.
Figure 10:
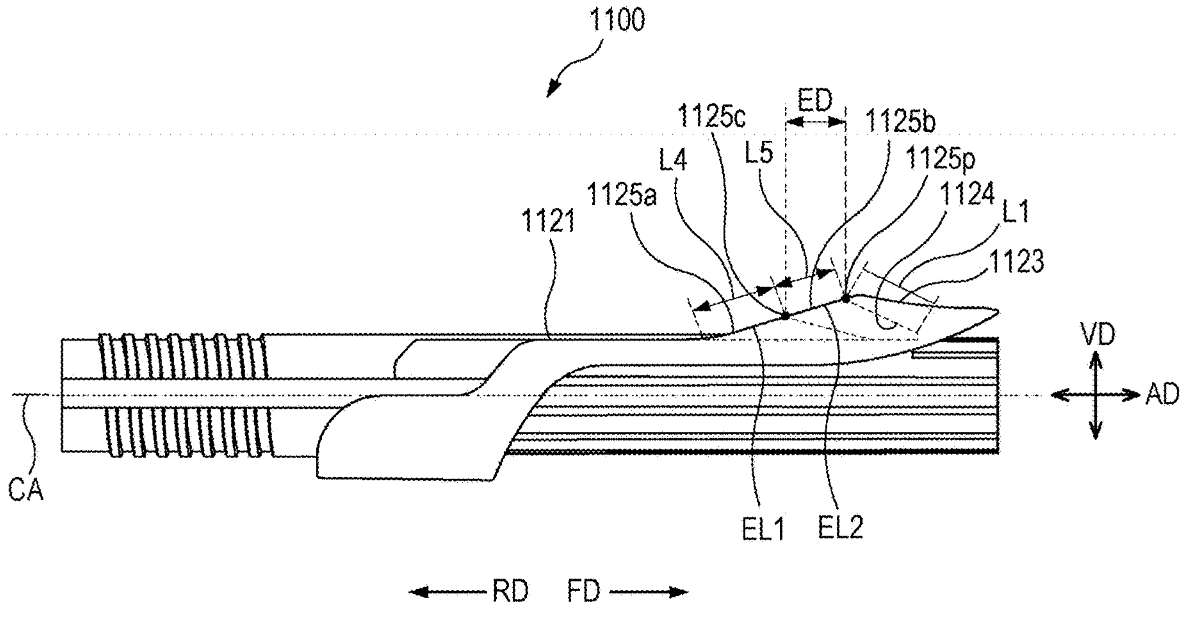
FIG. 10 is a side view of the seat body shown in FIG. 8.
Figure 11:
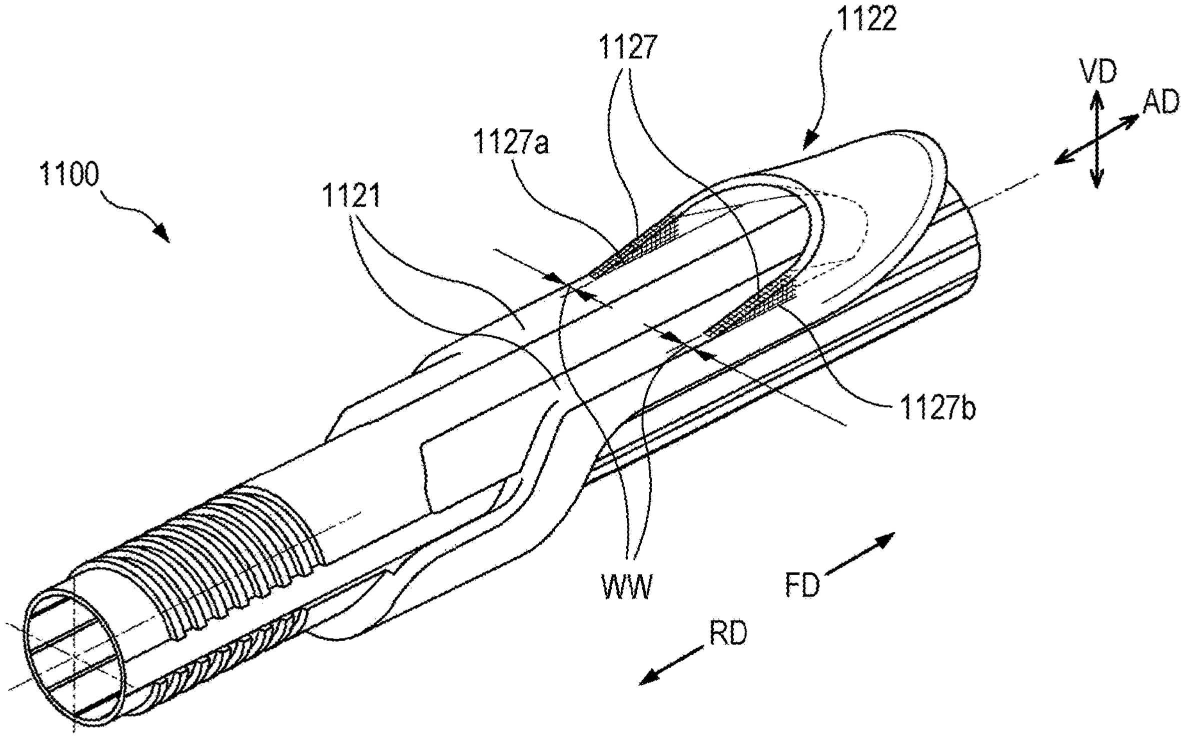
FIG. 11 is a perspective view showing a seat body according to one embodiment for explaining an inclined wall.
Figure 12:
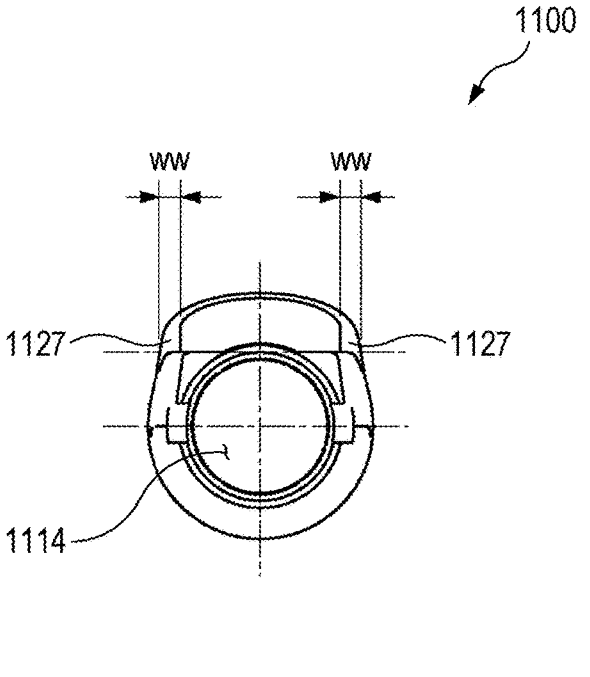
FIG. 12 is a front view of the seat body shown in FIG. 11.

FIG. 8 is a perspective view showing the seat body 1100 according to one embodiment for explaining the opening edge portion. FIG. 9 is a top view of the seat body 1100 shown in FIG. 8. FIG. 10 is a side view of the seat body 1100 shown in FIG. 8. FIG. 11 is a perspective view showing the seat body 1100 according to one embodiment for explaining an inclined wall. FIG. 12 is a front view of the seat body 1100 shown in FIG. 11. Reference is made to FIGS. 8 to 12.

Referring to FIGS. 8 and 9, the opening edge portion 1125 has a first opening edge portion 1125*a*. A pair of first opening edge portions 1125*a* are formed. The pair of first opening edge portions 1125*a* are formed to be spaced apart from each other with reference to the central axis CA. Each of the pair of first opening edge portions 1125*a* extends from its one end meeting the seating portion 1121 in the first plane VP1 in a direction perpendicular to a line where the seating surface 1121P and the first plane VP1 meet each other. Each of the pair of first opening edge portions 1125*a* has a first inward edge line EL1 that is formed along the line where the first opening edge portion 1125*a* and the inward surface 1124 meet each other. The first inward edge line EL1 has a straight line shape.

The opening edge portion 1125 has a second opening edge portion 1125*b*. The second opening edge portion 1125*b* is formed so as to interconnect the pair of first opening edge portions 1125*a*. The second opening edge portion 1125*b* is connected to the opposite end of each first opening edge portion 1125*a* formed on the opposite side of the one end. The second opening edge portion 1125*b* has a curved shape in the first plane VP1. The second opening edge portion 1125*b* may have a semicircular shape. The second opening edge portion 1125*b* has a second inward edge line EL2 formed along a line where the second opening edge portion 1125*b* and the inward surface 1124 meet each other. The second inward edge line EL2 has a curved shape. When the reel seat is viewed from a top view, the second inward edge line EL2 is formed so as to surround a portion of the central axis CA. For example, the second inward edge line EL2 has a semicircular shape surrounding a portion of the central axis CA. The second inward edge line EL2 is connected to the first inward edge line EL1 at an intersection point 1125*c*. The semicircular shape of the second inward edge line EL2 is tangent to the pair of first inward edge lines EL1 at the intersection point 1125*c*. A pair of intersection points 1125*c* are formed. Specifically, the first inward edge lines EL1 and the second inward edge line EL2 are connected continuously. The second inward edge line EL2 has a midpoint 1125*p* that bisects a length of the second inward edge line EL2.

Continuing with reference to FIG. 9, an edge width EW is defined as a length of a second line L2 interconnecting the pair of intersection points 1125*c*. An edge depth ED is defined as a length of a third line L3, which interconnects both the midpoint 1125*p* of the second inward edge line EL2 and a midpoint of the second line L2 interconnecting the pair of intersection points 1125*c*. The edge depth ED is a distance from the second line L2 interconnecting the pair of intersection points 1125*c* to the midpoint 1125*p* of the second inward edge line EL2. The edge depth ED is 0.45 to 0.55 times the edge width EW. Preferably, the edge depth ED is 0.5 times the edge width EW. Since the edge depth ED has a length of the aforementioned range with respect to the edge width EW, the stress felt on the angler's fingers gripping the reel seat can be reduced, and the grip feel can be enhanced accordingly.

Referring to FIG. 10, in the side view of the reel seat, a sum of a length L4 of one of the pair of first opening edge portions 1125*a* and a length L5 of the second opening edge portion 1125*b* is larger than a length of the first line L1. That is, in the side view of the reel seat, the length of the opening edge portion 1125 is larger than the length of the first line L1.

Referring to FIGS. 9 to 12, the fixed hood portion 1122 includes an inclined wall 1127 formed between each of the pair of first opening edge portions 1125*a* and the seating portion 1121. The inclined wall 1127 has an oblique side 1127*a* including one of the pair of first inward edge lines EL1. The inclined wall 1127 has a bottom side 1127*b* formed at a boundary between the fixed hood portion 1122 and the seating portion 1121. The inclined wall 1127 has a constant thickness ww. Preferably, the thickness ww of the inclined wall 1127 may be in the range of 2 mm to 3 mm. More preferably, the thickness ww of the inclined wall 1127 may be 2.5 mm. Since the inclined wall 1127 has the aforementioned thickness ww, a reel seat that has a sufficient tensile strength and has a sharp appearance can be provided. Further, due to the reduced thickness of the fixed hood portion 1122, when the first leg of the reel is inserted into the opening 1130, the step difference formed between the fixed hood portion 1122 and the first leg can be reduced, and the grip feel felt on the angler's fingers gripping the reel seat can be enhanced.

Figure 13:
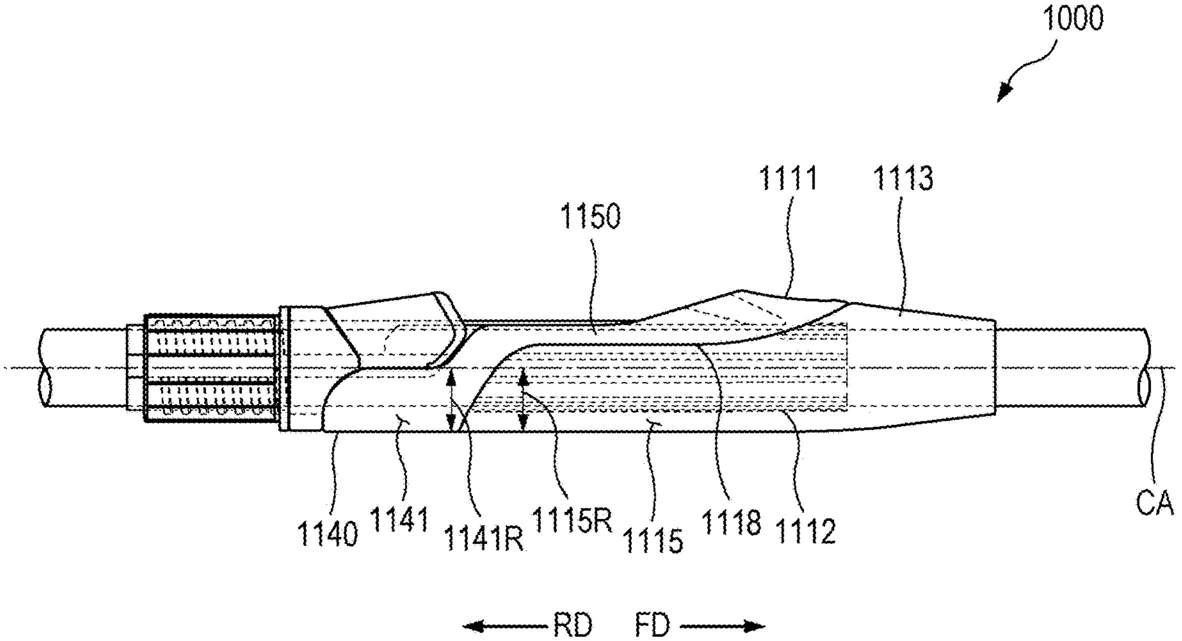
FIG. 13 is a side view of a portion of a fishing rod including a reel seat according to one embodiment.
Figure 14:
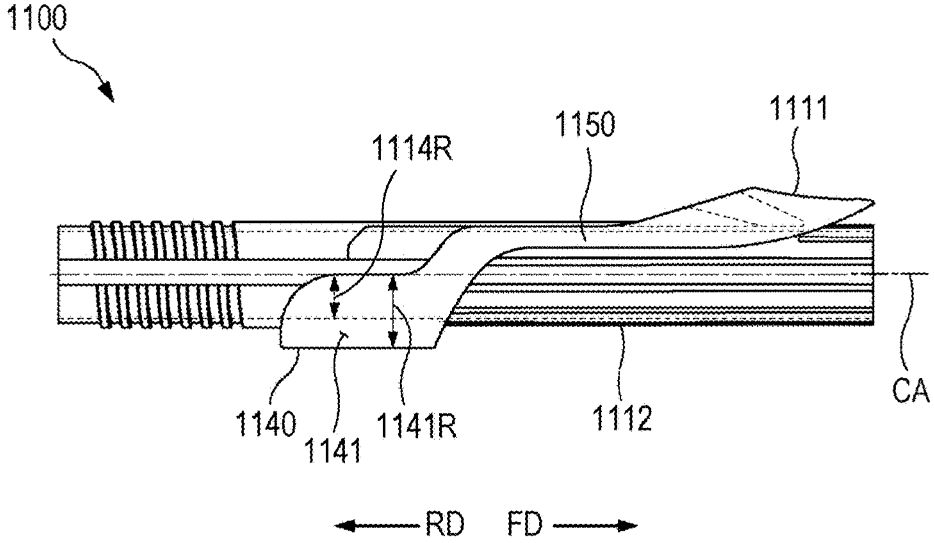
FIG. 14 is a side view of a seat body of the reel seat shown in FIG. 13.
Figure 15:
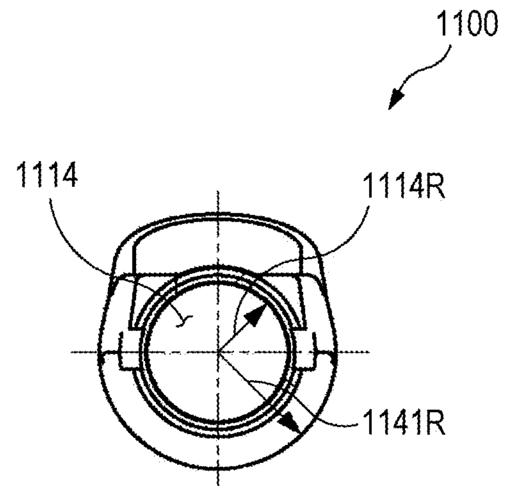
FIG. 15 is a front view of the reel seat shown in FIG. 13.

FIG. 13 is a side view of a portion of a fishing rod including a reel seat according to one embodiment. FIG. 14 is a side view of a seat body 1100 of the reel seat shown in FIG. 13. FIG. 15 is a front view of the reel seat shown in FIG. 13. The following descriptions are made with reference to FIGS. 13 to 15.

As described above, the seat body 1100 may include the male thread portion 1131, the attachment body 1111, the cylindrical portion 1112, and the grip body 1113. The attachment body 1111 includes the first projecting portion 1140 that forms the rear end portion of the attachment body 1111. The attachment body 1111 further includes a second projecting portion 1150 that forms a lateral end portion and a front end portion of the attachment body 1111. The second projecting portion 1150 extends from the first projecting portion 1140 along the central axis CA. The second projecting portion 1150 forms the fixed hood portion 1122 together with the seating portion 1121. The first projecting portion 1140 has a first outer peripheral surface 1141. The first projecting portion 1140 has a first radius 1141R. The first radius 1141R is defined as a distance from the central axis CA to the first outer peripheral surface 1141. A radius 1114R of the first bore (e.g., the first bore 1114 in FIG. 12) may have a range of 0.59 to 0.71 times the first radius 1141R. Preferably, the radius 1114R of the first bore 1114 may be 0.65 times the first radius 1141R. Due to the aforementioned ratio of the first radius 1141R and the radius 1114R of the first bore 1114, considering a length range and a length ratio of an angler's general palm and fingers, the reel seat can be formed so as to be gripped most conveniently.

The cutaway edge 1118 of the grip body 1113 is formed complementarily to edges of the first projecting portion 1140 and the second projecting portion 1150 of the attachment body 1111. The cutaway edge 1118 of the grip body 1113 is an edge formed by cutting away a portion of the grip body surrounding the second bore (e.g., the second bore 1116 in FIG. 4) in a shape complementary to the edge of the first projecting portion 1140 and the edge of the second projecting portion 1150. The cutaway edge 1118 is formed so as to expose the second bore 1116. The grip body 1113 has a second outer peripheral surface 1115. The grip body 1113 has a second radius 1115R. The second radius 1115R is defined as a distance from the central axis CA to the second outer peripheral surface 1115. The second radius 1115R is equal to the first radius 1141R. Specifically, the radius 1114R of the first bore (e.g., the first bore 1114 in FIG. 12) may have the range of 0.59 to 0.71 times the second radius 1115R. Preferably, the radius 1114R of the first bore 1114 may be 0.65 times the second radius 1115R. The second radius 1115R may be formed in a range of 10.0 mm to 14.5 mm. When the second radius 1115R has the aforementioned range, it is possible to design the reel seat having a thickness that allows the reel seat to be gripped most comfortably with reference to average lengths of the angler's palm and fingers. Under the assumption that the second radius 1115R is formed in the range of 10.0 mm to 14.5 mm, when the radius 1114R of the first bore 1114 is formed in a range of 6.0 to 8.0 mm, it is preferable that the radius 1114R of the first bore 1114 has a range of 0.59 to 0.65 times the second radius 1115R. Further, when the radius 1114R of the first bore 1114 is formed in a range of 8.0 mm to 10.0 mm, it is preferable that the radius 1114R of the first bore 1114 has a range of 0.65 to 0.71 times the second radius 1115R.

Figure 16:
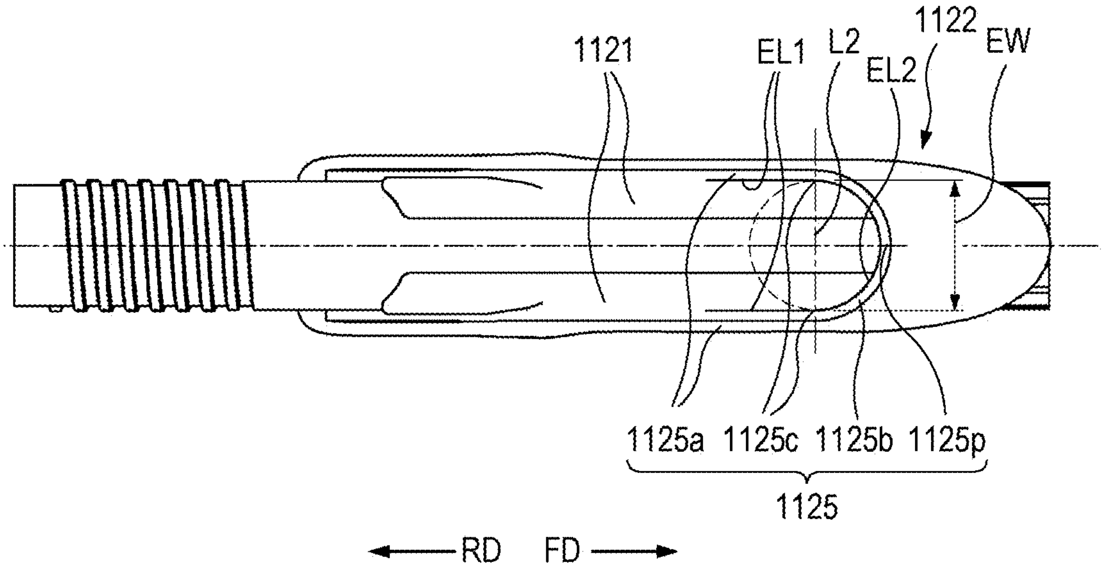
FIG. 16 is a top view of a seat body according to one embodiment for explaining length ratios between components of the seat body.
Figure 17:
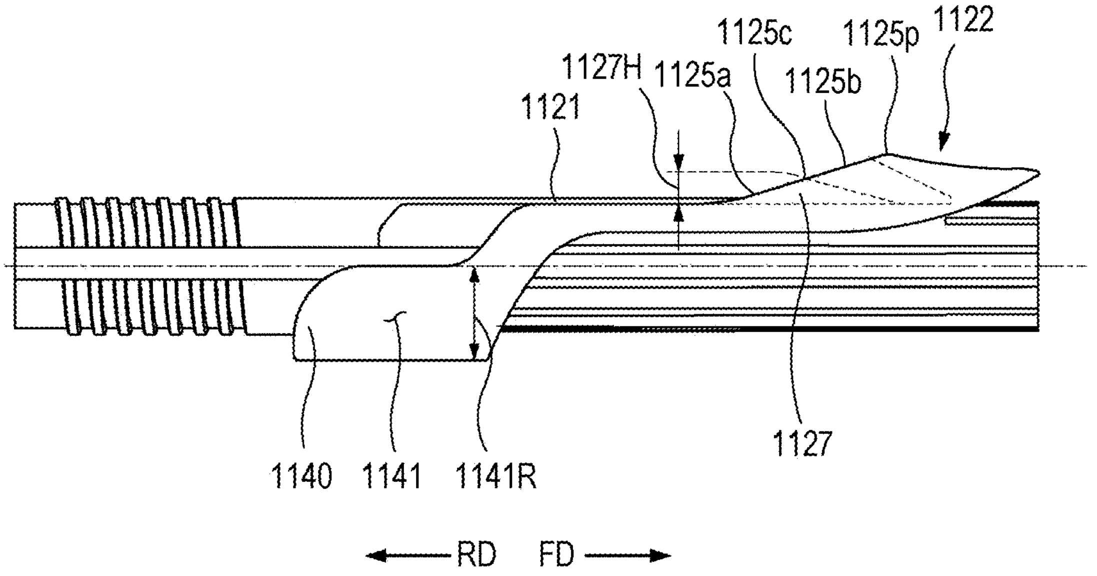
FIG. 17 is a side view of the seat body shown in FIG. 16.
Figure 18:
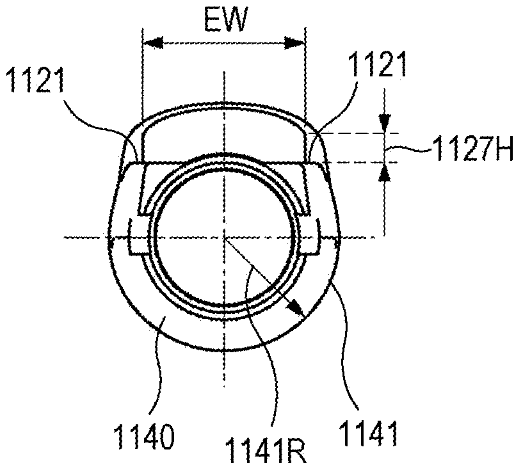
FIG. 18 is a front view of the seat body shown in FIG. 16.

FIG. 16 is a top view of the seat body 1100 according to one embodiment for explaining length ratios between components of the seat body. FIG. 17 is a side view of the seat body 1100 shown in FIG. 16. FIG. 18 is a front view of the seat body 1100 shown in FIG. 16. Reference is made to FIGS. 16 to 18.

As described above with reference to FIGS. 9 and 10, the opening edge portion 1125 has the pair of first opening edge portions 1125*a* and the second opening edge portion 1125*b* interconnecting the pair of first opening edge portions 1125*a*. Each of the pair of first opening edge portions 1125*a* has the first inward edge line EL1 formed along the line where the first opening edge portion 1125*a* and the inward surface (e.g., the inward surface 1124 in FIG. 10) meet each other. The second opening edge portion 1125*b* has the second inward edge line EL2 formed along the line where the second opening edge portion 1125*b* and the inward surface 1124 meet each other. The semicircular shape of the second inward edge line EL2 is tangent to the pair of first inward edge lines EL1 at the intersection point 1125*c*. The intersection points 1125*c* are formed in a pair. The edge width EW is defined as the length of the second line L2 interconnecting the pair of intersection points 1125*c*. Further, as described above with reference to FIGS. 13 to 15, the first projecting portion 1140 has the first outer peripheral surface 1141. The first projecting portion 1140 has the first radius 1141R. The first radius 1141R is defined as the distance from the central axis CA to the first outer peripheral surface 1141. The edge width EW may have a range of 1.18 to 1.42 times the first radius 1141R. Preferably, the edge width EW may be 1.3 times the first radius 1141R.

When considering the thickness of the reel leg of a commonly used spinning reel, the edge width EW may be formed in a range of 14.5 mm to 17.0 mm. A reel used in a fishing rod is selected depending on the radius (e.g., the radius 1114R in FIG. 12) of the first bore (e.g., the first bore 1114 in FIG. 12). Thus, under the assumption that the edge width EW is formed in the range of 14.5 mm to 17.0 mm, when the radius 1114R of the first bore 1114 is formed in the range of 6.0 to 8.0 mm, it is preferable that the edge width EW has a range of 1.30 to 1.42 times the first radius 1141R. Further, when the radius 1114R of the first bore 1114 is formed in the range of 8.0 to 10.0 mm, it is preferable that the edge width EW has a range of 1.18 to 1.30 times the first radius 1141R.

Continuing with reference to FIGS. 16 to 18, the fixed hood portion 1122 includes the inclined wall 1127 formed between each first opening edge portion 1125*a* and the seating portion 1121. The inclined wall 1127 has a constant height 1127H. The height 1127H of the inclined wall 1127 is defined as a distance from the seating portion 1121 to the intersection point 1125*c*. The height 1127H of the inclined wall 1127 may have a range of 0.19 to 0.27 times the first radius 1141R.

To design the height 1127H of the inclined wall 1127 so as to approximate a height of the reel leg of a commonly used spinning reel, the height 1127H may be formed in a range of 2.1 mm to 3.6 mm. A reel used in a fishing rod is selected depending on the radius (e.g., the radius 1114R in FIG. 14) of the first bore (e.g., the first bore 1114 in FIG. 12). Thus, under the assumption that the height 1127H of the inclined wall 1127 is formed in the range of 2.1 mm to 3.6 mm, when the radius 1114R of the first bore 1114 is formed in the range of 6.0 to 8.0 mm, it is preferable that the height 1127H has a range of 2.1 mm to 2.3 mm or a range of 0.19 to 0.21 times the first radius 1141R. Further, when the radius 1114R of the first bore 1114 is formed in the range of 8.0 to 10.0 mm, it is preferable that the height 1127H has a range of 3.3 mm to 3.6 mm or a range of 0.25 to 0.27 times the first radius 1141R.

Figure 19:
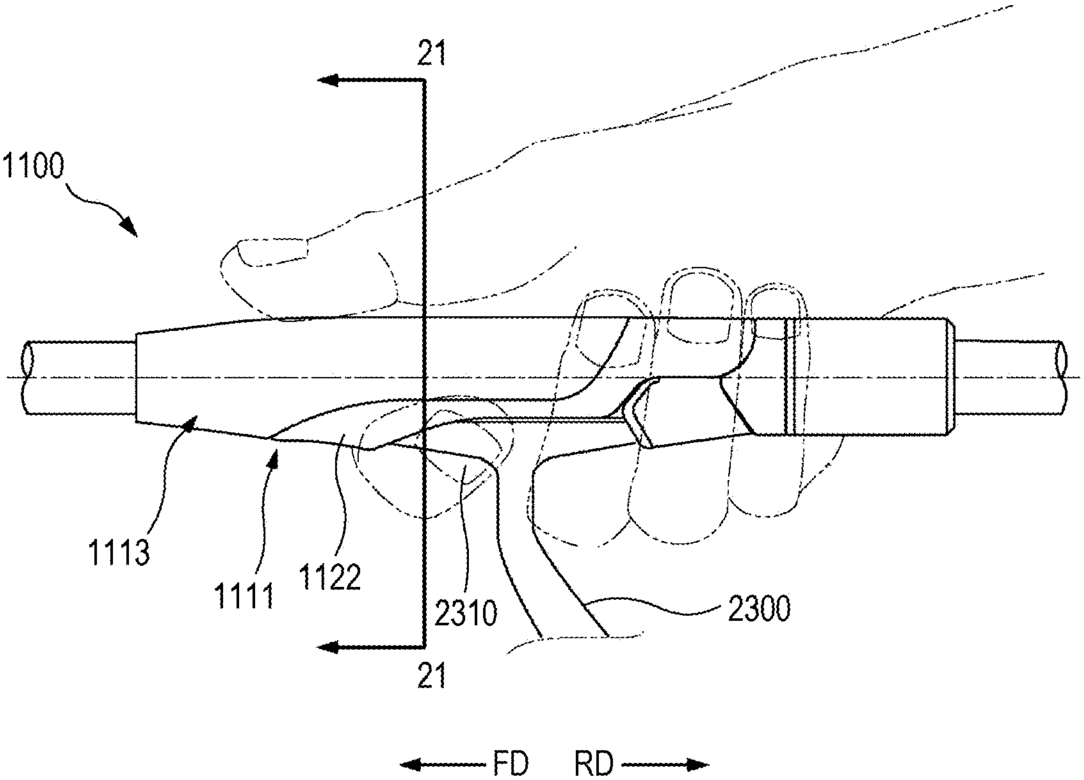
FIG. 19 is a side view of a portion of a fishing rod according to one embodiment showing an example where an angler grips a reel seat in a state where a reel is attached to the reel seat according to one embodiment.
Figure 20:
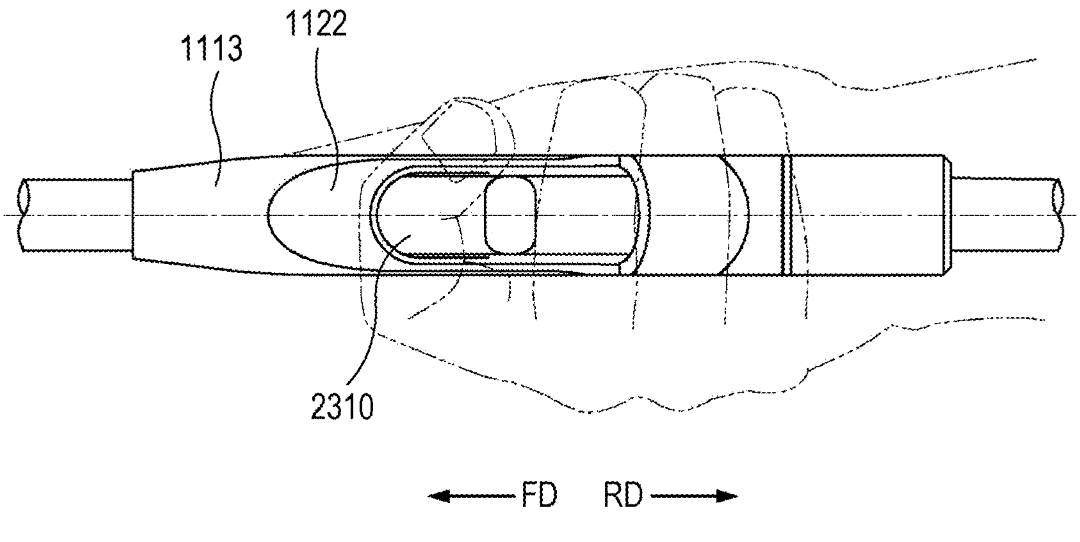
FIG. 20 is a bottom view of a portion of the fishing rod shown in FIG. 19.
Figure 21:
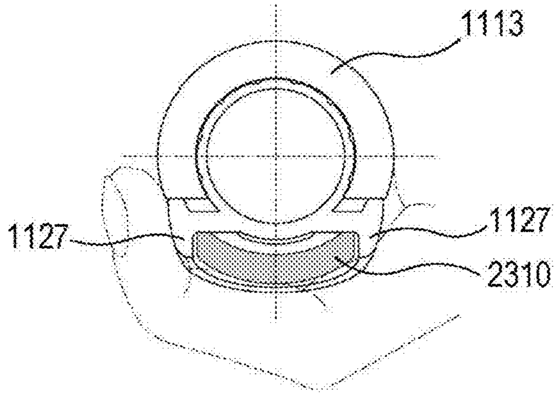
FIG. 21 is a cross-sectional view taken along line 21-21 of FIG. 19.

FIG. 19 is a side view of a portion of a fishing rod according to one embodiment showing an example where an angler grips a reel seat when a reel is attached to the reel seat according to one embodiment. FIG. 20 is a bottom view of a portion of the fishing rod shown in FIG. 19. FIG. 21 is a cross-sectional view taken along line 20-20 in FIG. 19. Reference is made to FIGS. 19 to 21.

The reel seat according to one embodiment is designed such that the length ratios and/or dimension ratios between respective components included in the reel seat are within the aforementioned ranges. Thus, the step difference between the first leg 2310 and the fixed hood portion 1122 of the attachment body 1111 can be reduced. Therefore, the finger gripping the fixed hood portion 1122 of the reel seat and the first leg 2310 of the reel 2300 (e.g., an angler's index finger in FIGS. 19 to 21) can comfortably grip the reel seat, and the angler can maintain a comfortable grip feel during fishing. The angler's thumb is positioned on the outer peripheral surface of the grip body 1113, thereby helping to grip the reel seat 1000 more comfortably. Continuing with reference to FIG. 21, the inclined walls 1127 of the fixed hood portion 1122 may have a curved outward surface so as to have continuity with the rounded shape of the outer peripheral surface of the grip body 1113. Therefore, the grip feel felt by the angler while gripping the reel seat 1000 can be further enhanced.

Figure 22:
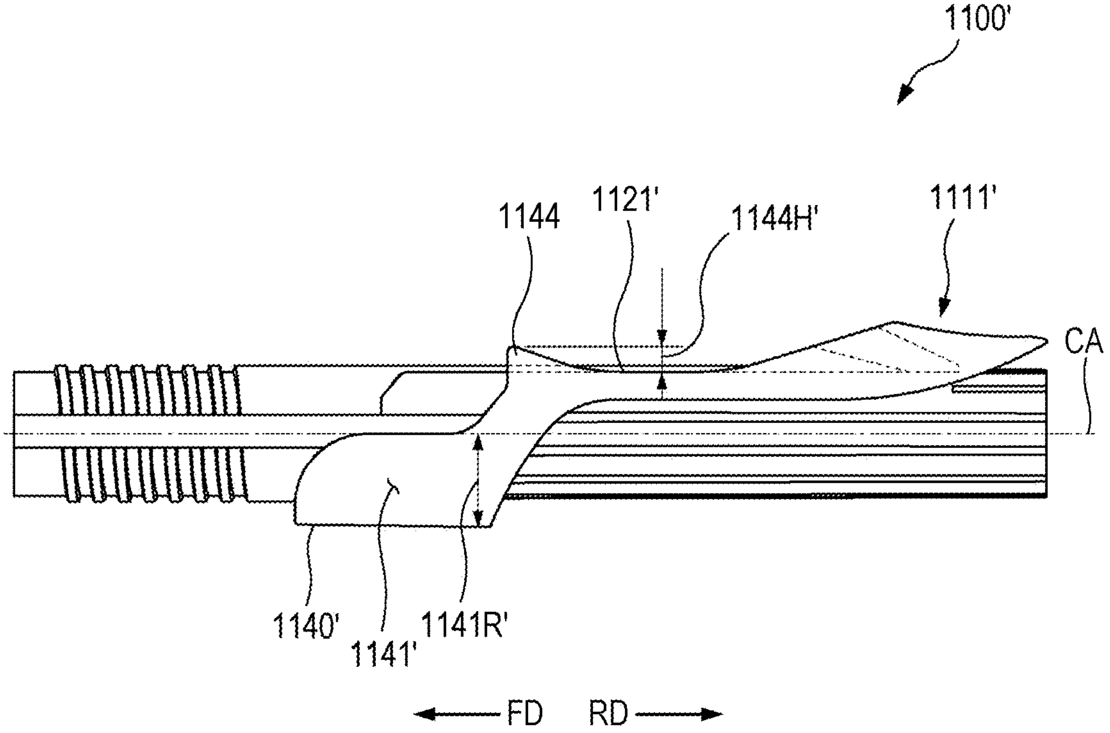
FIG. 22 is a side view of a seat body according to another embodiment.
Figure 23:
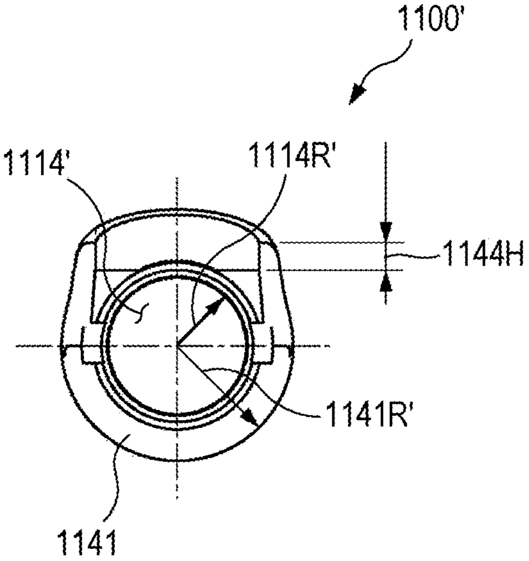
FIG. 23 is a front view of the seat body shown in FIG. 22.

FIG. 22 is a side view of a seat body 1100' according to another embodiment. FIG. 23 is a front view of the seat body 1100' shown in FIG. 22. Reference is made to FIGS. 22 and 23.

Figure 24:
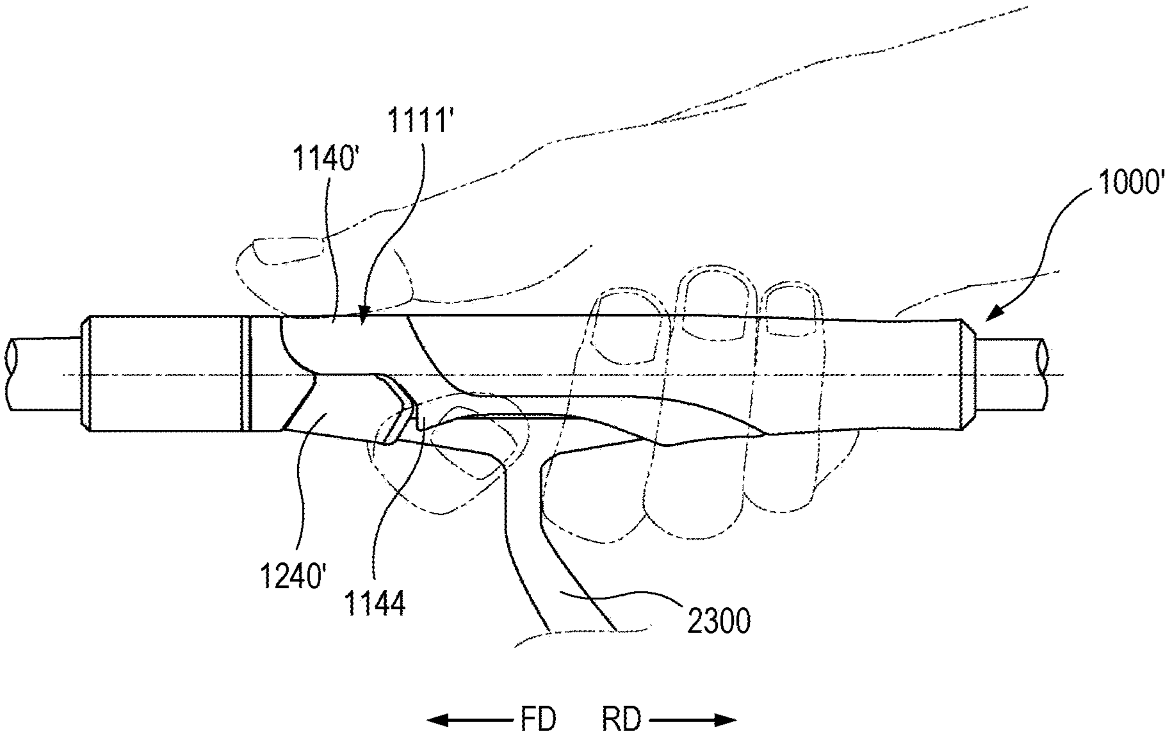
FIG. 24 is a side view of a portion of a fishing rod according to one embodiment showing an example where an angler grips a reel seat in a state where a reel is attached to the reel seat having a seat body according to another embodiment.

The seat body 1100' includes all of the same components as those included in the seat body 1100 according to the foregoing embodiment described with reference to FIGS. 4 to 21, except for components which are described below. The seat body 1100' has the attachment body 1111'. The attachment body 1111' includes the first projecting portion 1140' forming a front end portion of the attachment body 1111'. When an angler grips the attachment body 1111' of the seat body, the angler's palm may make contact with the first projecting portion 1140'. The first projecting portion 1140' is formed in the circumferential direction CD of the central axis CA. The first projecting portion 1140' has the first outer peripheral surface 1141'. The first projecting portion 1140' has the first radius 1141R'. The first radius 1141R' is defined as the distance from the central axis CA to the first outer peripheral surface 1141'. The attachment body 1111' further includes a pair of inclined protruding portions 1144. The pair of inclined protruding portions 1144 are located at the opposite side of the first projecting portion 1140 with reference to the central axis CA. The pair of inclined protruding portions 1144 are disposed so as to be adjacent to a boundary of the movable hood portion (e.g., the movable hood portion 1240 in FIG. 4) of the movable hood (e.g., the movable hood 1200 in FIG. 4). The pair of inclined protruding portions 1144 are formed so as to protrude upward from the seating portion 1121?(e.g., the seating portion 1121 in FIG. 4). Each of the pair of inclined protruding portions 1144 has an inclined protrusion height 1144H. The inclined protrusion height 1144H is defined as a distance from the seating portion 1121' to the apex of each inclined protruding portion 1144. The inclined protrusion height 1144H may have a range of 0.06 to 0.10 times the first radius 1141R'. In this regard, it is preferable that the radius 1114R' of the first bore 1114' is formed in a range of 6.0 mm to 10.0 mm. FIG. 24 is a side view of a portion of a fishing rod according to one embodiment showing an example where an angler grips a reel seat when a reel is attached to the reel seat having a seat body according to another embodiment. Reference is made to FIG. 24.

A reel seat 1000' according to another embodiment shown in FIG. 24 is a so-called down-lock type reel seat in which the movable hood portion 1240' is disposed at the front side of the reel seat. The orientation of the components included in the reel seat 1000' can be understood by reversing the front and rear orientations of the components of the reel seat according to the above-described embodiment. The reel seat 1000' is designed such that the length ratios and/or dimension ratios between respective components included in the reel seat 1000' are within the aforementioned ranges. Thus, the step difference among the leg of the reel 2300, the movable hood portion 1240', and the inclined protruding portions 1144 of the attachment body 1111' can be reduced. Therefore, the finger gripping the movable hood portion 1240' of the reel seat, the inclined protruding portions 1144 of the attachment body 1111', and the leg of the reel 2300 (e.g., an angler's index finger in FIG. 24) can comfortably grip the reel seat, and the angler can maintain a comfortable grip feel during fishing. The angler's thumb is positioned on the first projecting portion 1140' of the attachment body 1111', thereby helping to grip the reel seat 1000' more comfortably.

The technical idea of the present disclosure has been described heretofore with reference to some embodiments and examples shown in the accompanying drawings. However, it is to be understood that various substitutions, modifications, and alterations may be made without departing from the technical idea and scope of the present disclosure that can be understood by those of ordinary skill in the technical field to which the present disclosure pertains. Further, it is to be understood that such substitutions, modifications, and alterations fall within the scope of the appended claims.

What is claimed is:

1. A reel seat for mounting a reel having a first leg and a second leg to a rod body of a fishing rod, the reel seat comprising:

a seat body including a seating portion on which the first leg and the second leg are seated, and a fixed hood portion which is located in the seating portion and into which the first leg is inserted, wherein the seat body is coupled to the rod body along a central axis of the rod body; and a movable hood movably coupled to the seat body so as to fix the second leg to the seating portion, wherein the fixed hood portion includes:

an opening edge portion extending from the seating portion so as to form an opening into which the first leg is inserted; and an inward surface extending from the opening edge portion and covering the first leg, wherein the opening edge portion is positioned in a first plane inclined at an acute angle with respect to a seating surface in which the seating portion is formed, wherein the first plane and a first line bisecting the inward surface along the central axis are configured to meet each other at an obtuse angle, wherein the seat body includes:

a cylindrical portion having a first bore capable of being coupled to the rod body; and an attachment body having: the seating portion formed at an upper side or a lower side of the cylindrical portion; a first projecting portion located at an opposite side of the seating portion with reference to the central axis and formed in a circumferential direction of the central axis; and a second projecting portion extending along the central axis from the first projecting portion along an outer periphery of the cylindrical portion and forming the fixed hood portion together with the seating portion, wherein the movable hood is movably coupled to a male thread portion located opposite to the fixed hood portion, and wherein the movable hood includes:

an accommodating portion into which the first projecting portion is inserted along the central axis; and a movable hood portion located at an opposite side of the accommodating portion in a vertical direction, overlapping the first projecting portion along the central axis, and fixing the second leg to the seating portion.

2. The reel seat of claim 1, wherein the seating surface is parallel to the central axis and the first plane is inclined at an angle of 15 to 25 degrees with respect to the seating surface.

3. The reel seat of claim 1, wherein the opening edge portion includes:

a pair of first opening edge portions extending from the seating portion and spaced apart from each other with reference to the central axis; and a second opening edge portion interconnecting the pair of first opening edge portions, wherein each of the pair of first opening edge portions has a first inward edge line, which is formed along a line where the first opening edge portion meets the inward surface and has a straight line shape, and wherein the second opening edge portion has a second inward edge line, which is formed along a line where the second opening edge portion meets the inward surface and has a semicircular shape.

4. The reel seat of claim 3, wherein, when viewed from a top view of the reel seat, an edge depth defined as a length of a third line, which interconnects a midpoint of a second line interconnecting intersection points between the pair of first inward edge lines and the second inward edge line and a midpoint of the second inward edge line, is 0.45 to 0.55 times an edge width defined as a length of the second line.

5. The reel seat of claim 4, wherein, when viewed from the top view of the reel seat, the semicircular shape of the second inward edge line is tangent to the pair of first inward edge lines at the intersection points.

6. The reel seat of claim 3, wherein, when the reel seat is viewed from a side view, a sum of a length of one of the pair of first opening edge portions and a length of the second opening edge portion is larger than a length of the first line.

7. The reel seat of claim 3, wherein the fixed hood portion includes an inclined wall between each of the pair of first opening edge portions and the seating portion, and wherein the inclined wall has an oblique side including one of the pair of first inward edge lines, and a bottom side formed at a boundary between the fixed hood portion and the seating portion.

8. The reel seat of claim 7, wherein the inclined wall has a constant thickness, and the thickness at a boundary between the inclined wall and the seating portion is in a range of 2 mm to 3 mm.

9. The reel seat of claim 1, wherein the seat body further includes a grip body into which the cylindrical portion is fitted and which is coupled to the rod body of the fishing rod, and wherein the grip body includes:

a second bore into which the cylindrical portion is fitted along the central axis;

a third bore communicating with the second bore and capable of being coupled to the rod body of the fishing rod; and a cutaway edge formed complementarily to an edge of the first projecting portion and an edge of the second projecting portion and cut away so as to expose a portion of the second bore.

10. The reel seat of claim 9, wherein the first projecting portion has a first radius, which is a distance from the central axis to an outer peripheral surface of the first projecting portion, and a radius of the first bore is in a range of 0.59 to 0.71 times the first radius.

11. The reel seat of claim 10, wherein the grip body has a second radius equal to the first radius at a portion where the cutaway edge is formed.

12. The reel seat of claim 10, wherein the opening edge portion includes:

a pair of first opening edge portions extending from the seating portion and spaced apart from each other with reference to the central axis; and a second opening edge portion interconnecting the pair of first opening edge portions, wherein each of the pair of first opening edge portions has a first inward edge line facing the central axis and having a straight line shape, wherein the second opening edge portion has a second inward edge line formed in a semicircular shape, and wherein, when the reel seat is viewed from a top view, an edge width, which is defined as a length of a second line interconnecting intersection points between the first inward edge lines and the second inward edge line, is in a range of 1.18 to 1.42 times the first radius.

13. The reel seat of claim 12, wherein the fixed hood portion includes an inclined wall between each of the pair of first opening edge portions and the seating portion, and wherein the inclined wall has a height, which is defined as a length from the seating portion to each of the intersection points and is in a range of 0.19 to 0.27 times the first radius.

14. The reel seat of claim 10, wherein the attachment body further includes a pair of inclined protruding portions located at an opposite side of the first projecting portion with reference to the central axis and protruding from the seating portion, and wherein each of the pair of inclined protruding portions has a height, which is defined as a distance from the seating portion to an apex of each of the inclined protruding portions and is in a range of 0.06 to 0.10 times the first radius.

15. The reel seat of claim 1, wherein the seat body is integrally formed and is made of carbon fiber-reinforced thermoplastic resin.

16. A fishing rod comprising:

a rod body; and the reel seat of claim 1 coupled to the rod body.

* * * * *